June 13, 1967

F. G. CIZEK 3,324,790

MULTIPLE CLOSING HOT PRESS

Filed Jan. 19, 1965

INVENTOR.
Frank G. Cizek,
BY Parker & Carter
Attorneys.

Fig. 3.

INVENTOR.
Frank G. Cizek,
BY Parker & Carter
Attorneys.

United States Patent Office 3,324,790
Patented June 13, 1967

3,324,790
MULTIPLE CLOSING HOT PRESS
Frank G. Cizek, Milwaukee, Wis., assignor to Nordberg Manufacturing Company, Milwaukee, Wis., a corporation of Wisconsin
Filed Jan. 19, 1965, Ser. No. 426,566
20 Claims. (Cl. 100—93)

This invention relates to a multiple opening and closing plate press in which means are provided for simultaneously closing the different plates in the press.

An object of this invention is a multiple opening and closing press wherein flexible lines or ropes of different lengths are secured at one of their ends to beams and at the other ends to plates positioned below such beams, and such beams are pivotable so that when they are raised the ropes with different lengths pull the different plates to a closed position generally simultaneously.

Another object is a multiple opening and closing press with a simultaneously closing assembly that provides for a plurality of beams to be raised and lowered in generally equalized movement so that the different ropes attached to such beam may generally simultaneously close the plates to which said ropes are secured.

Another object is a multiple plate press in which a plurality of beams are raised or lowered with generally equalized motion, and stabilizing means are provided to prevent such beams from swinging in their path of travel.

Another object is a multiple plate press with a closing assembly in which a pressing assembly is provided to press such plates once they have been placed in their closed position.

Another object is a multiple closing press with separate means for simultaneous closing of the plates and then pressing the plates, together with means for introducing hot fluid to the individual plates to effect a hot plate pressing action.

Another object is a multiple plate press with means for simultaneously closing the plates whereby a plurality of flexible ropes of different lengths are attached to a raising or lowering beam at one of their ends, and to different plates at their other ends; and where three other beams are similarly disposed to provide additional rope connections to the different plates so that each plate has four lifting points to close the plates.

Another object is a simultaneous closing assembly for the plates in a multi-platen press whereby flexible ropes of different lengths are secured at one of their ends to a raising and lowering beam and at their other ends to different plates in the press; and where the ropes are turned around an assembly of staggered sheaves so that each rope may perform its lifting operation without interfering with associated ropes.

The foregoing objects are realized together with other objects which will become apparent from the following disclosure, made up in part by the attached drawing wherein.

Figure 1:
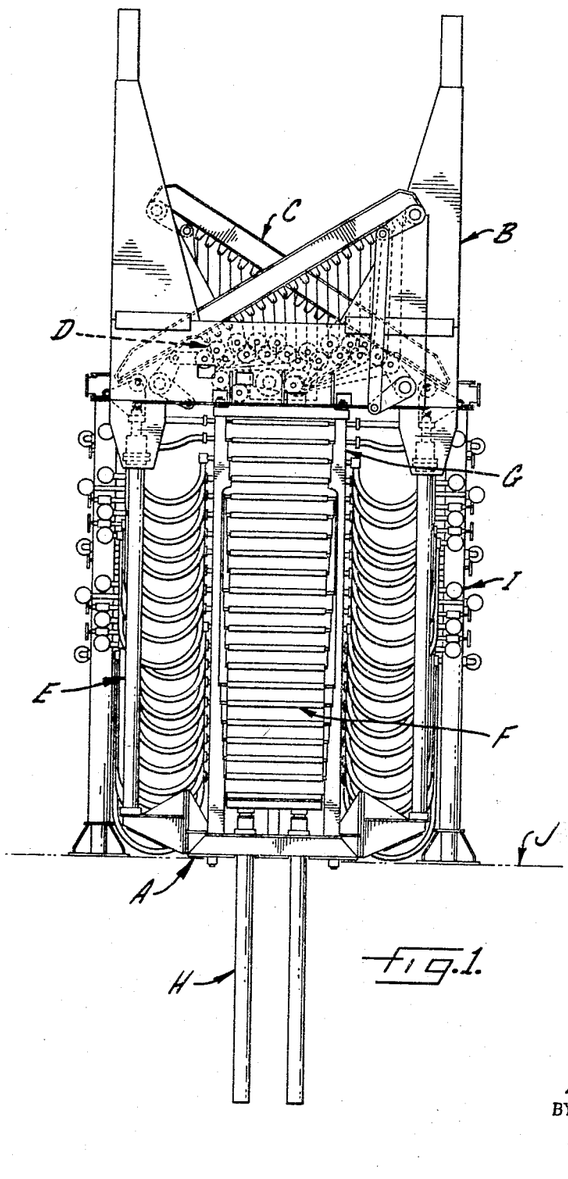
FIGURE 1 is a front elevational view of a press showing various features of the invention.

FIGURE 1 shows an illustrated multi-platen press which embodies features of the invention. Such a press includes a frame A with a top structure B. The top structure is shown with a plurality of pivoted beams or arms C from which flexible lines are carried around a sheave assembly D. The free end of each beam or arm is raised by lifting the cylinder such as E whereby the plates or platens F become closed generally simultaneously. Each beam or lifting arm has a line connected to a different plate, the lines toward the lower ends of the beams fixed to the more further spaced plates, and the lines towards the raised or pivoted ends fixed to the more closely spaced plates. The plates in their fully open or inactive position rest on stops in supports or ladders G. When the plates are closed by the raising beams, a plurality of pressing cylinders H press the plates together with the desired level of force. In the press shown, the plates are of the hotplate variety having a chamber to receive hot fluid through a manifold unit I. The press is shown on the ground or equivalent support J.

*Frame with platen supports and manifold headers*

Figure 2:
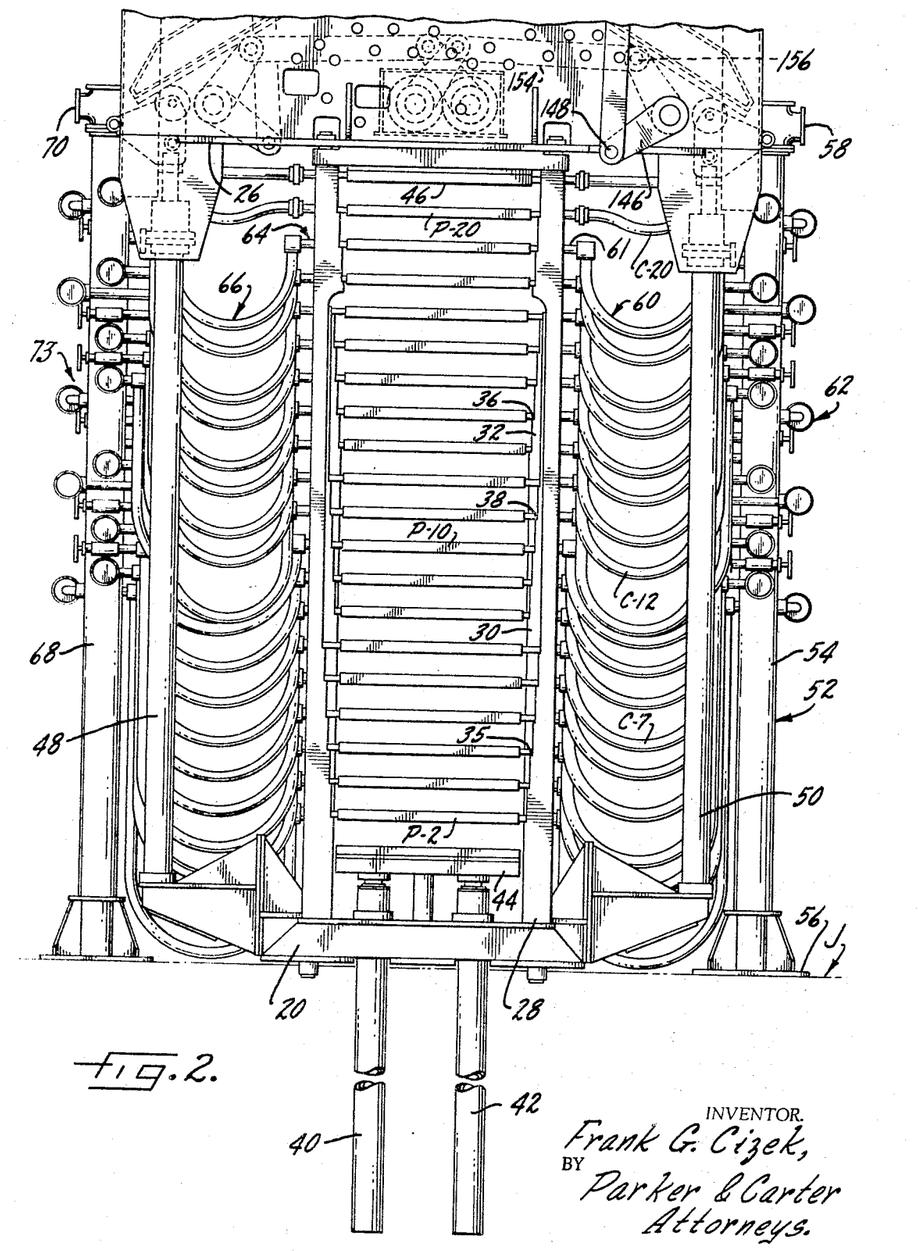
FIGURE 2 is an enlarged elevational view of FIGURE 1 with parts removed.
Figure 4:
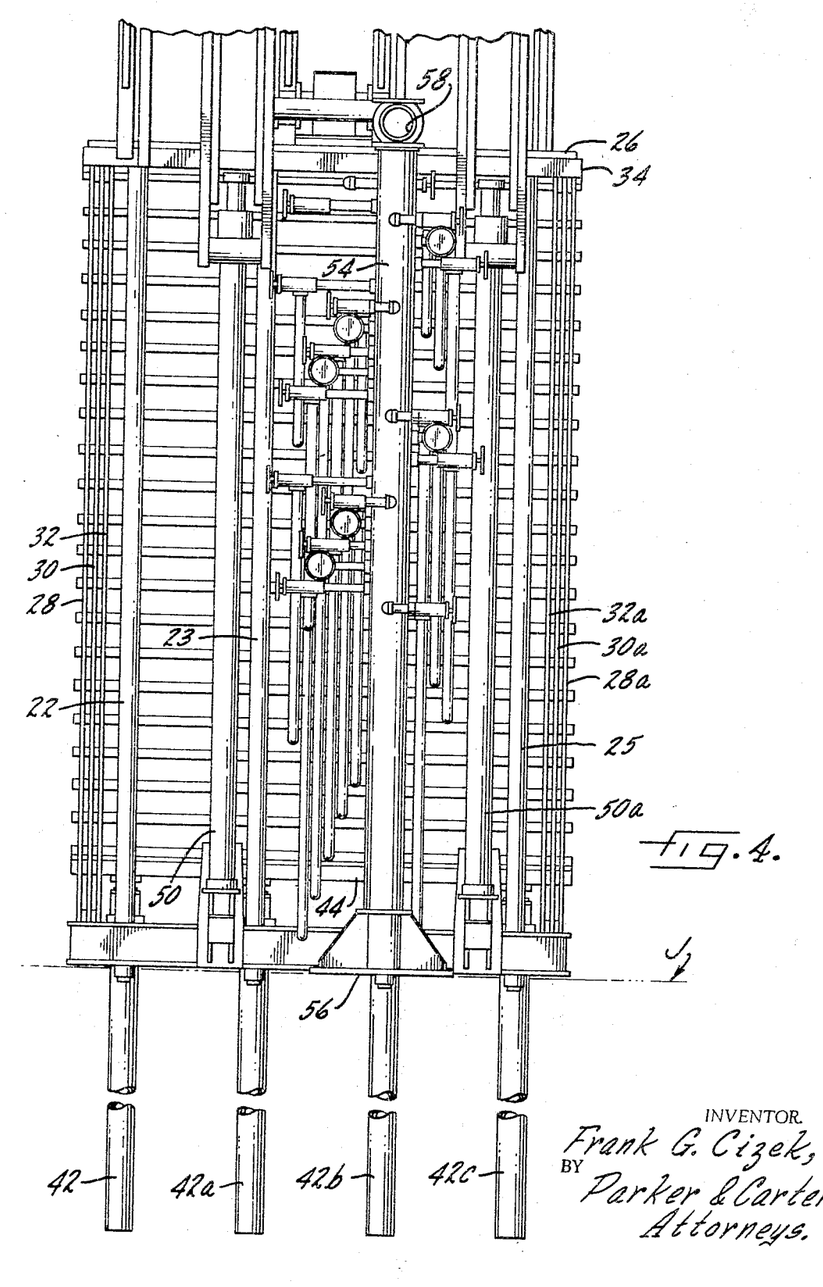
FIGURE 4 is an enlarged side elevational view with parts removed of the press shown in FIGURE 1.

Referring to FIGURES 2 and 4 the frame is shown as including a heavy base 20 which may be formed from I-beams, channels, angle-irons or the like, and a plurality of upright standards or column supports such as 22, 23, 24 and 25. Similar vertical column supports will be on either side of the press. The column supports are fixed at their upper ends to a floor 26 of the top structure B.

A plurality of plate supports or ladders such as 28, 30 and 32 are shown disposed at one corner of the base. The lower ends are securely joined to the base 20 and the upper ends are shown fixed to a plate or top cap 34 secured to the floor 26 of the top structure. Another set of ladders are shown at another corner of the base as 28a, 30a and 32a. Two other sets of ladders are oppositely disposed to the set shown so that a plate may be supported at four corners. Each ladder has staggered stops in stepwise fashion so that a plurality of plates may be supported in the same general area without interference. A set of stops such as 35 are shown on ladder 28, 36 on ladder 32 and 38 on ladder 30. The same arrangement is duplicated with the other sets of ladders at the various corners.

In the illustrated press there are 21 plates. Through the base 20, eight pressing cylinders are operable in the illustrated embodiment. The front view shows a pair of cylinders 40 and 42, and the side view of FIGURE 4 shows cylinders 42a, 42b and 42c aligned with cylinder 42. It is understood that a similar set of three cylinders would be aligned with cylinder 40. Such pressing cylinders are powered by conventional hydraulic means which are not shown. The cylinders either support or are fixed to a bottom press platen 44, and this platen is pressed against the plates disposed above when such plates are moved to the closed position.

The plates are moved by flexible lines attached to the pivoted beams or arms C. Nineteen of such plates are shown and will be referred to as plates P-2 to P-20. Representative plates are indicated at P-2, P-10 and P-20. A top plate or platen 46 is shown as stationary, and plates P-2 to P-20 are pressed between bottom platen 44 and top platen 46.

Figure 3:
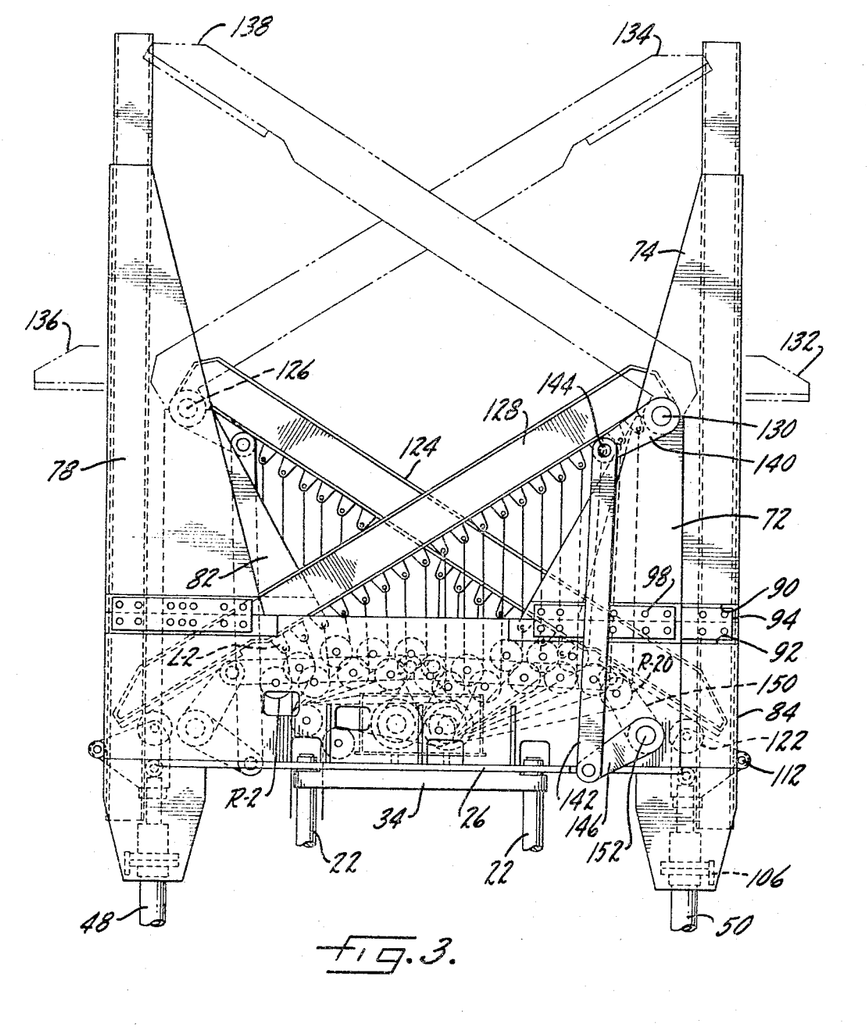
FIGURE 3 is an enlarged elevational view of the top structure shown in FIGURE 1.

The beams or pivoted arms are raised to close plates P-2 to P-20 in a manner to be described in greater detail, but the ends of such beams or plates are raised by lifting cylinders, one cylinder positioned below the free end of each arm or beam C. The press which is illustrated has four arms or beams and therefore four lifting cylinders which may be seen in FIGURES 2, 3 and 4. On one side of the press are lift cylinders 48 and 48a, and on the other side lift cylinders 50 and 50a are laterally spaced from cylinders 48 and 48a to accommodate the adjoining beams. Such lifting cylinders are likewise powered by conventional hydraulic means which are not shown.

On one side of the press an inlet manifold header is shown generally as 52. It includes a column tube 54 anchored to the supporting surface or ground J by foot plate 56. Hot fluid enters inlet 58 of the manifold header and is distributed via conduits shown generally as 60 into couplings such as 61 and then into the plates P-2 to P-20. The pressing plates P-2 to P-20 are partially hollow (not shown) to receive such hot fluid. A series of valve controls shown generally at 62 are provided to control the rate and feed of the hot fluids through the inlet conduit 60. The hot fluid fed into the plates moves out of such plates through outlet couplings shown generally at 64, into outlet conduits shown generally at 66, and then passes into outlet manifold header 68. The fluid moves out of the header 68 by outlet 70. A series of valve controls shown generally as 73 are used to control the rate and feed of fluid transferred out of the hot plates. The apparatus and connections which introduce hot fluid into inlet 58 and pass such fluid out of outlet 70 are not described since they do not as such comprise a part of the invention, and since the set up and operation of such assemblies are well known.

The conduits shown generally as 60 and 66 are an aggregate of individual conduits, each of which feeds via a coupling such as 61 to each of the plates P-2 to P-20. For example, conduit C-7 would feed into plate P-7, conduit C-12 into plate P-12 and conduit C-20 into plate P-20. In this embodiment, another hot fluid conduit 63 is provided to feed hot fluid into stationary plate 46.

*Top structure and pivoted beams*

Figure 5:
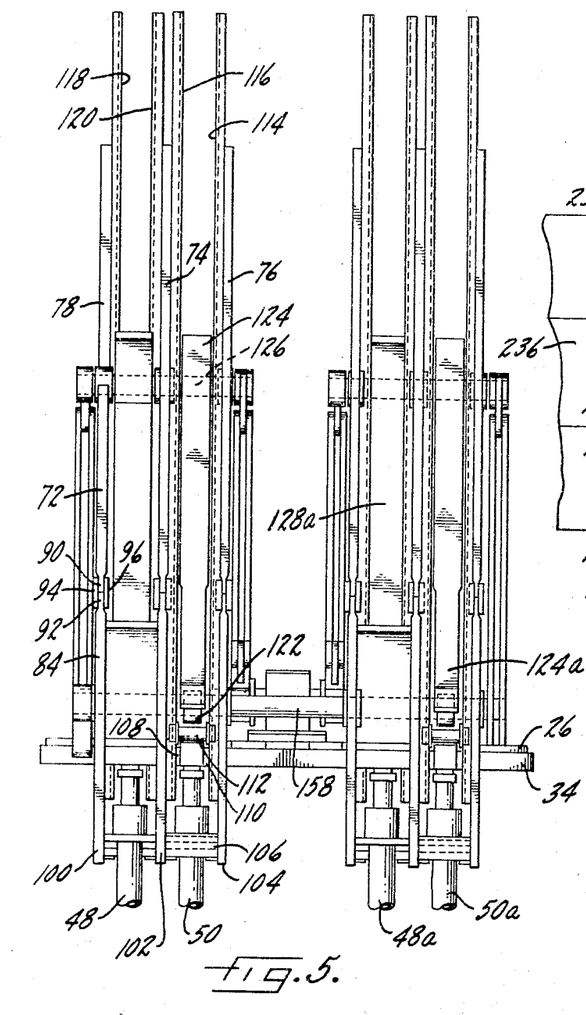
FIGURE 5 is a side elevational view of the top structure with parts removed and parts broken away.

The floor 26 of the top structure is shown to be basically a frame with cut out portions. The top plate or top cap 34 is shown fixed to the floor panel by means such as bolts or the like 35. At opposed corners there are three tapered walls such as short tapered wall 72 and long tapered walls 74 and 76. Short wall 72 opposes long tapered wall 78 at the opposite corner, long tapered wall 74 opposes long tapered wall 80, and long tapered wall 76 opposes short tapered wall 82. The tapered walls are seated upon transverse walls 84, 86 and 88. The adjoining tapered and transverse walls have portions of reduced thickness such as 90 and 92 on walls 72 and 84, and such reduced thickness portions are fixed by double connectors 94 and 96 which are secured by means such as bolts or the like 98. The transverse walls have flange portions such as 100, 102 and 104 extending below the floor frame and top cap 34. Flange portions 102–104 hold plates 106 which have an opening through which passes lifting cylinder 50; flange 100 holds similar plates with a spaced flange which is behind 102 in FIGURE 5. It will be understood that similar flanges are disposed at the corners of the press so that four lifting cylinders pass through openings in plates such as 106.

A lifting cylinder such as 50 is joined to a carriage formed in part by spaced plates 108, 110. The carriage has a forward track roller 112 adapted to ride channels 114 and 116 which are respectively secured to long tapered walls 74 and 76. A similar set of channels 118, 120 are likewise secured to long tapered walls 78 and 80. The carriage has an upper roller 122 adapted to engage the lower free end of beam 124. As the arms are raised and lowered, the roller 112 on the carriage below the free end rides the channel tracks between the tapered walls, and such engagement of the roller with the channel tracks keeps the free end of the arms traveling in a smooth arc so that no sway or side to side swinging movement occurs.

The raised end of beam 124 is connected to a fixed pivot at 126 positioned between long wall 80 and short wall 82. Beam or arm 124 opposes and is laterally spaced from beam or arm 128 which is on a fixed pivot 130 between short wall 72 and rlong wall 74. It will be seen that when the arms are in the inactive or lowered positions, the ends secured to the fixed pivots 126 and 130 are raised, and the free ends rest on a roller such as 122 of the carriage fixed to the top of a lift cylinder such as 50. When the lift cylinders are raised, the arms will be raised by rollers such as 122 riding a bottom surface of the arm towards its opposed pivot point. When an arm is half raised, it will extend beyond the tapered walls as indicated by phantom lines at 132. At this position the free end of the beam or arm will be even with its fixed pivot. As the arm is further raised by the lifting cylinder, it will assume the position shown by phantom line 134 in the fully raised position. Here, the free end of the arm is substantially as high above its fixed pivot as it was below its fixed pivot at the fully inactive position. A type of simple harmonic motion is therefore defined by the sweep of the arm from its fully inactive to its fully active positions. Opposed arm or beam 124 will move through its motions at the same time as arm 128. Thus, free end of arm 128 will be even with its fixed pivot at generally mid point, as indicated by phantom line 136. As shown by phantom 138, it will be raised above its fixed pivot about the same distance in fully active position as it was below its fixed pivot at fully inactive or resting position.

The foregoing description applied to the pair of opposed beams or arms 124, 128 and their supporting structures, located at the front of the top structure. It will be understood that the back part of the top structure has similar opposed arms 124a, 128a and lifting cylinders 48a, 50a to likewise engage movable carriages which ride on track channels 118a, 120a and 114a, 116a. Such channels are secured to long tapering walls 74a, 76a and 78a, 80a. The corresponding short tapered walls are shown at 72a and 82a.

*Stabilizer assembly for raising beams*

A stabilizer assembly linkage is provided next to the fixed pivot of each arm to ensure that all the arms will move in unison when they are raised and lowered. The linkage system of each arm is responsively joined so that the movement of any arm is sensed and reported by the other arms. Referring to FIGURES 2, 3, 7 and 8, such a linkage is shown in association with arms or beams 128 and 128a. A link 140 moves about fixed pivot 130. This link is fixed to vertically movable link 142 by pivot 144. The vertically movable link is fixed to a radially movable link 146 at pivot 148. Link 146 is connected to obliquely movable link 150 by pivot 152 and obliquely movable link 150 is connected to laterally movable link 154 by pivot 156. Joined to pivot 152 is connected link 158 which extends transversely across the top structure and is joined to a like pivot in a similar linkage assembly associated with beam 128a at the back of the top structure. Beams 124 and 124a have similar linkage assemblies and a similiar connecting link 158a (see FIGURE 6).

Figure 6:
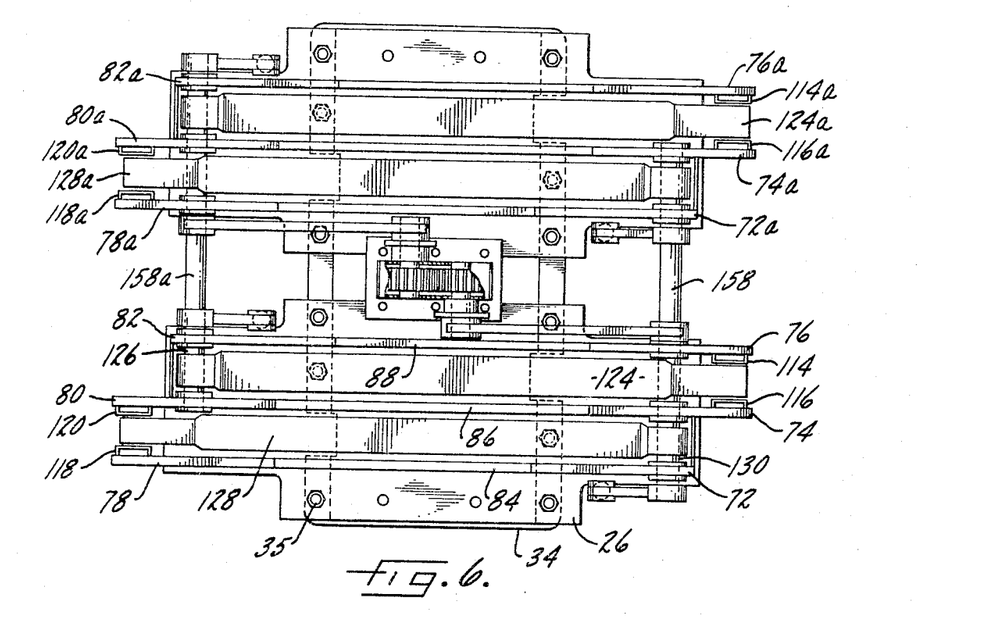
FIGURE 6 is a top plan view of the top structure.
Figure 7:
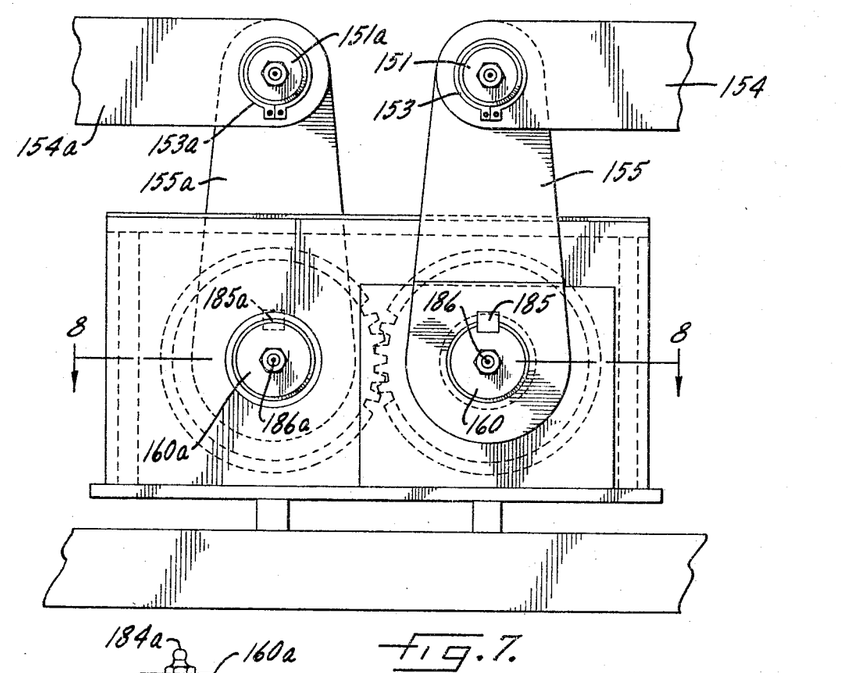
FIGURE 7 is an enlarged side elevational view of the stabilizer connection for the top structure.
Figure 8:
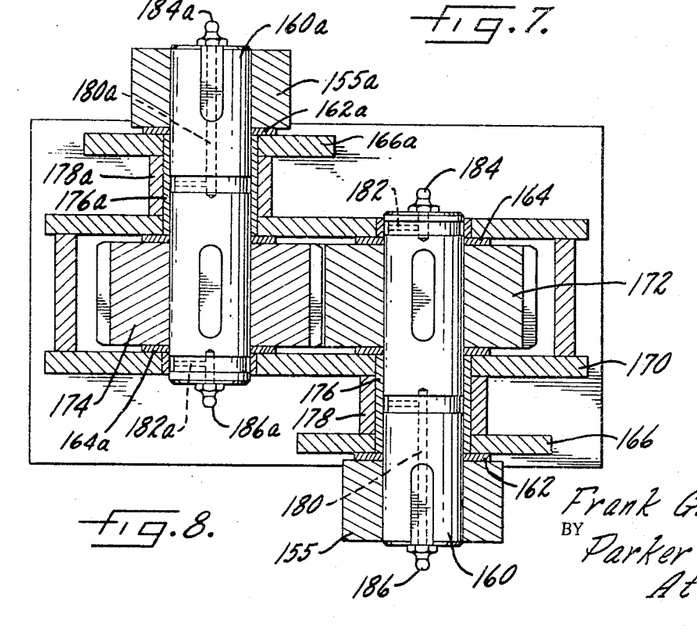
FIGURE 8 is a view along line 8—8 of FIGURE 7.

The motion of a pair of raising arms on one side of the top structure is reported to the opposed arms on the other side of the top structure by the laterally movable or equalizer links such as 154. Opposed to such link is a similar link 154a which is part of the linkage assembly associated with opposed beam 124. The laterally movable links are respectively joined by link arms or equalizer link rods 155 155a pivotally joined to shafts 160 and 160a. Thrust washer such as 162, 164 and 162a, 164a may be disposed between bearing plates 166 and 166a and rods 155 and 155a respectively, and between the wall of housing 170 and equalizer gears 172 and 174. Bushings such as 176 and 176a may be positioned between the shafts and spacers 178 and 178a. The shafts may be provided with interior passageways such as 180, 182 and 180a, 182a to provide a lubrication path to the bearing surfaces. Caps such as 184, 186 and 184a, 186a may be removed to introduce the lubricants. Laterally movable link 154 is joined to link 155 by a movable pivot connection which comprises a shaft 151 held by a split ring 153. A similar shaft 151a held by split ring 153a comprises the movable pivot between laterally movable link 154a and link arm 155a. The equalizer gear 172 turns the shaft 160 because they are keyed together at 185, and equalizer gear 174 likewise turns with shaft 160a because they are keyed together at 185a.

*Sheave assembly*

Positioned below each beam or arm is a sheave assembly as shown in FIGURES 9–12. This assembly provides a plurality of staggered rollers, sheaves or pulleys around which turn the various ropes or flexible lines connected to the superimposed beams. The staggered positions of the pulleys keep one line from fouling with another, and all the lines are connected to the plates P–2 to P–20 at one general corner area, as will be more fully described later.

Figure 9:
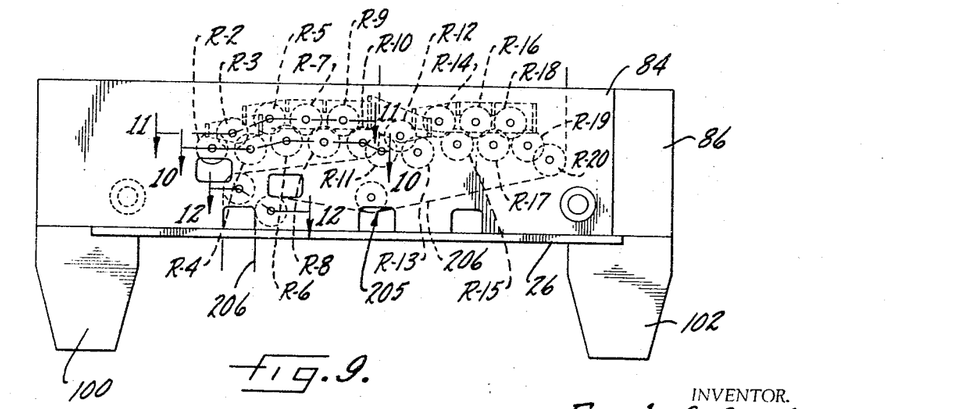
FIGURE 9 is a more or less diagrammatic side elevational view of the sheave assembly.
Figure 10:
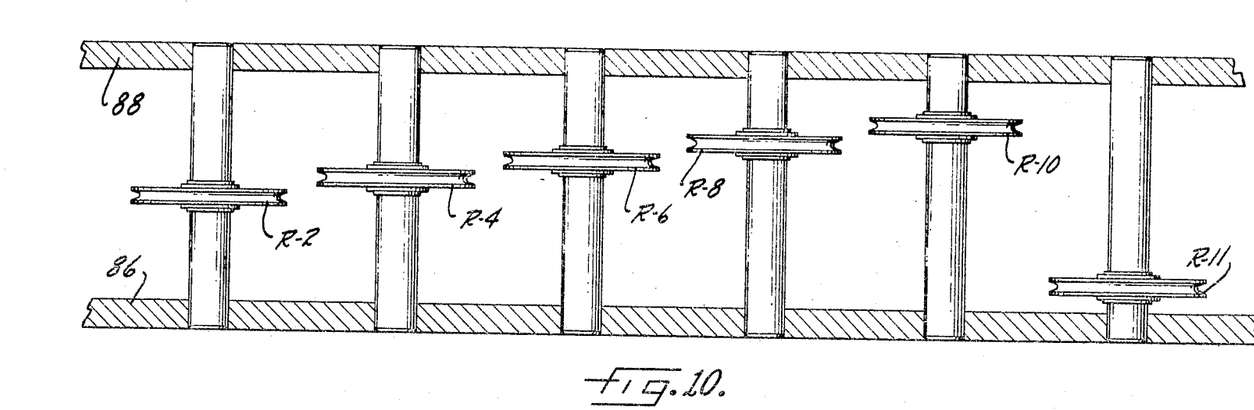
FIGURE 10 is a view along line 10—10 of FIGURE 9.
Figure 11:
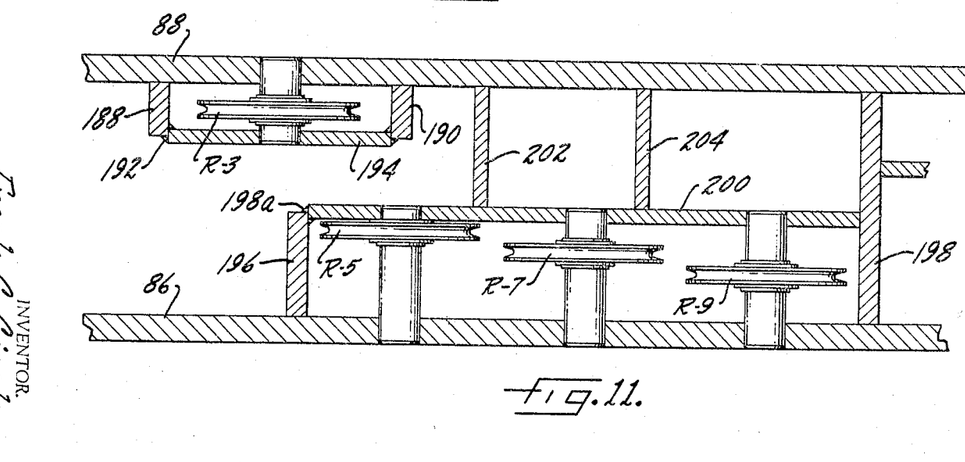
FIGURE 11 is a view along line 11—11 of FIGURE 9.

The sheave assembly shown in FIGURES 9 represents the disposition of the pulleys below beams 128 and 128a. The order would be reversed from left to right for beams 124 and 124a. Pulleys R–2 to R–20 receive corresponding ropes which ropes are respectively secured to plates P–2 to P–20 at one of their ends, and at the other ends to lugs L–2 to L–20 depending from the beams, some of which lugs are indicated in the various views. The sheaves or pulleys rotate on shafts supported by transverse walls such as 86 and 88. Referring to FIGURE 10, the sheaves R–2, R–4, R–6, R–8, R–10 and R–11 are shown in staggered positions on their respective shafts, and FIGURE 11 shows the staggered positions of sheaves R–3, R–5, R–7 and R–9.

The shaft for pulley R–3 is supported in a housing formed by sidewalls 188 and 190 fixed by welds such as 192 to front wall 194. The pulleys R–5, R–7 and R–9 rotate on shafts in a housing defined by side walls 196 and 198 securely fixed by welds such as 198a to a connecting wall 200. Spacers such as 202 and 204 are shown fixed between the transverse walls 188 and the connecting wall 200.

Figures 12, 13:
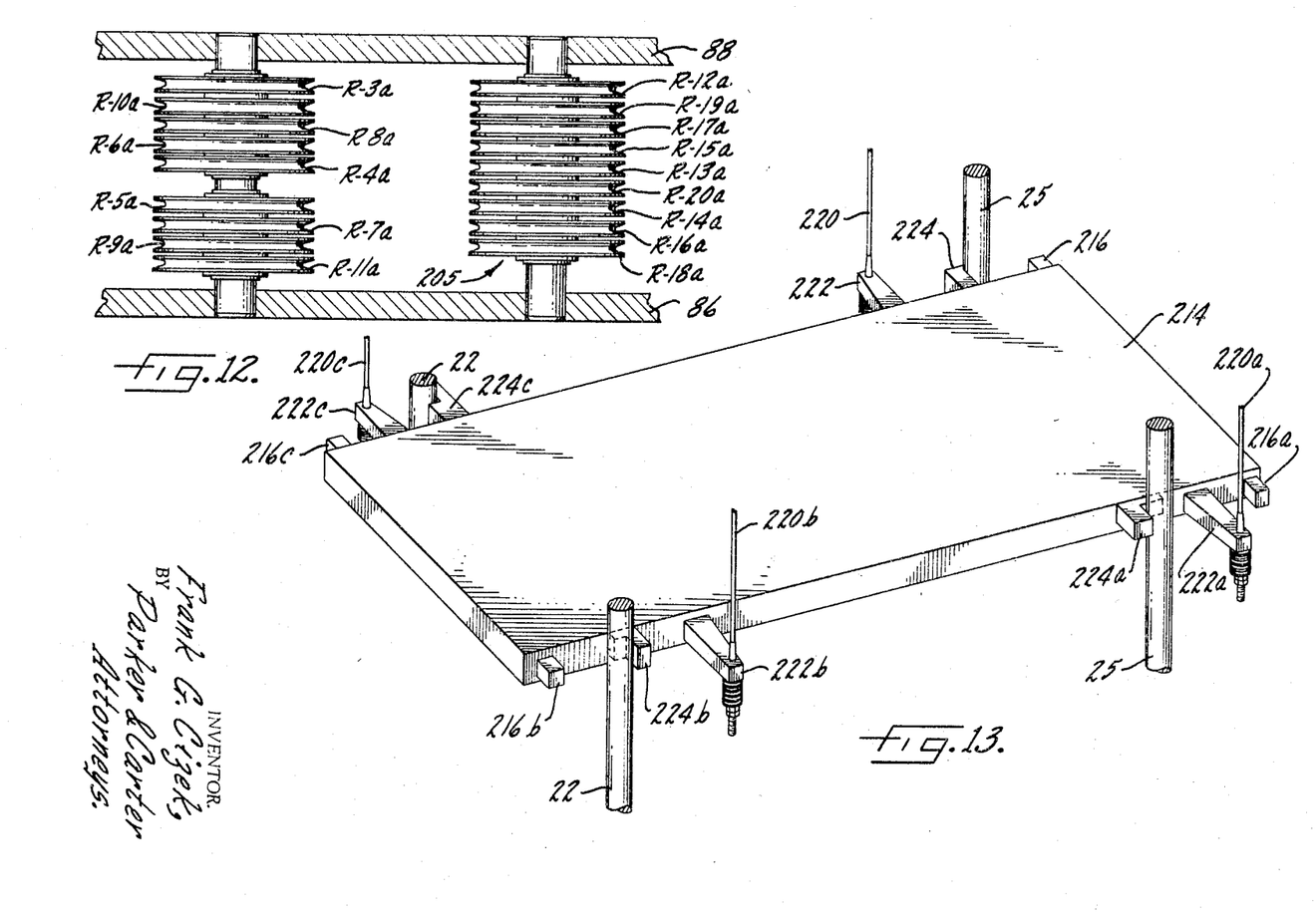
FIGURE 12 is a view along line 12—12 of FIGURE 9.
FIGURE 13 is a perspective view with parts removed showing rope connections to a selected plate and stops for supporting the plate.

Another sheave assembly indicated at 205 in FIGURE 9 is identical to the sheave assembly shown in FIGURE 12 which includes pulleys R–12a to R–20a. The ropes which turn around upper pulleys R–3 to R–19 turn around the bottom of the correspondingly respective pulleys in assembly 204, and then turn around the top of the assembly shown in FIGURE 12. The pattern of such ropes is schematically represented by 206 in which the line is partly solid and partly dotted. The rope from L–2 turns around sheave R–2 and then drops alongside the plates without turning around the lower sheave or sheaves. It is understood that the foregoing pattern is repeated for each beam so that a group of ropes or flexible lines extend along a general area in each corner of the superimposed plates.

*Rope connections*

The rope or flexible lines from each arm are connected to a different plate in a staggered relationship. The place where the ropes are joined to the plates may be referred to as connection points and each plate will have four connection points coerresponding to the lines received from each of the four beams. Referring to FIGURE 4, the ropes from beam 124 are positioned behind lifting cylinder 50 and the ropes from beam 124a are positioned behind lifting cylinder 50a.

Figure 15:
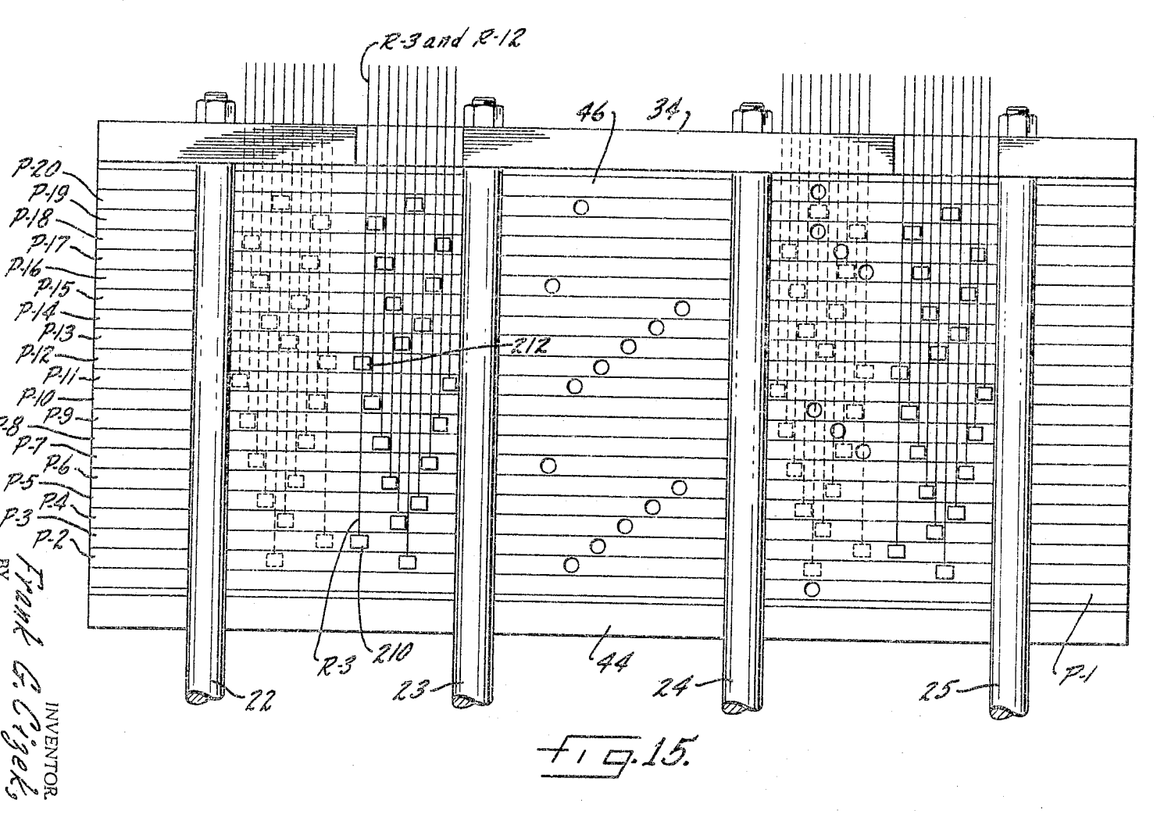
FIGURE 15 is a diagrammatic side elevational view of the closed plates with rope connections and with parts removed.

Referring to FIGURE 15, the staggered relationship of the rope connections are diagrammatically shown, with the lifting cylinders removed for purposes of clarity. The conduit inlets from the inlet header are also shown in staggered relationship. Each rope is connected to a wire rope support bracket as represented by 210. The brackets are of different lengths so that, for example, wire support bracket 212 would be shorter than bracket 210 so that rope R–3 and rope R–12 can lie in the same plane which is normal to the edges of the platens. Two other sets rope connections are shown in dotted line on the reverse sides so that each plate has four lifting points. The details of the rope connections to the brackets and to the plates are better seen in FIGURE 13. A representative plate 214 is shown with four corner stop blocks 216, 216a, 216b and 216c. These blocks contact, in the open position, ladders such as 28, 30 and 32 as shown in FIGURE 4. The blocks are of different lengths on the different plates so they may rest on stops which are at different lateral positions on the ladders as shown in FIGURE 2. Four wire ropes 220, 220a, 220b and 220c are shown connected to the wire brackets 222, 222a, 222b and 222c. To maintain the path of travel of the plates in a straight vertical path, angular guides are fixed to the plates such as 224 and 224a, 224b and 224c. The angular guides frictionally engage column guides 22 and 25 on both sides of the plate 214. The column guides extend from the base to the top cap or top plate 34.

Figure 14:
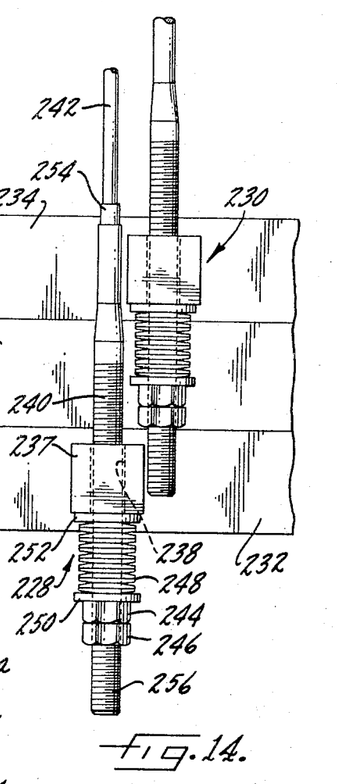
FIGURE 14 is a side elevational view on an enlarged scale of the rope connections to the individual plates.

Rope connecting assemblies 228 and 230 are shown in FIGURE 14 mounted respectively to platens 232 and 234. Another assembly would of course be mounted on intermediate plate 236 but at a staggered point which is not shown. An assembly includes the wire rope bracket 237 which has a slightly oversize bore 238 to freely receive threaded stud 240. The threaded stud is in the tubular form and receives throughout its length the end of a wire rope 242. The stud is compressed to lock and secure the wire rope by locknuts 244, 246. A set of Belleville springs are shown at 248 between thrust washers 250 and 252. The springs cushion or absorb the thrust force when the plates are lifted by the raising beams. The threaded stud is shown with a wrench grip portion 254 to hold the stud while the nuts are locked in position. Such threaded studs have separations such as 256 extending substantially along the axial length of the threaded portion so the stud may be compressed onto the wire when the nuts are locked in position. Such studs are available under the designation of MacWhyte "Safe Locks." The Belleville springs not only absorb the shock but they also provide a flexible means for taking up slack in the wire ropes while the plates are at rest on the ladders or stops. The Belleville springs further absorb small variations that may occur in the rope lengths when the plates are closed.

The use and operation of my invention are as follows:

A press has been provided wherein a plurality of pressing plates are disposed within a frame and means have ben provided for simultaneously closing such plates in such multiplaten presses. The lowermost plates travel further than plates placed at a higher position. The means presented for simultaneously closing such plates are advantageously disposed at the top of the press and are further disposed so that they can perform their closing operation without requiring means which would extend laterally away from the press. Such outrigger means require more space and pose problems of structural reinforcement to meet the imbalance of such outriggers.

The present means for simultaneously closing the plates include a plurality of beams having a fixed pivot at one of their ends. The other ends of the beams extend substantially as far as the breadth of the press frame. The fixed pivot is at a raised position so that the movable end is free to move above and below the fixed point to about the same extent. Thus, a type of simple harmonic motion is obtained when the beam moves from a position of full rest to a position of complete execution which simultaneously closes the plates. The simultaneous closing of said plates is obtained by providing a plurality of flexible lines or ropes which are connected at one of their ends along the length of the movable beam. Such ropes are mediated by a sheave or pulley assembly which is staggered so that each rope may be connected to a different plate at its other end in staggered relationship. The lifting operation of one rope does not then interfere with another rope. A plurality of such lifting beams are provided on top of the press so that each plate has a plurality of lifting points.

A preferred arrangement has been shown wherein two pairs of beams are placed on top of the press, the beams in each pair being opposed to each other to advantageously utilize the space on top of the press. Such opposed relationship has the additional advantage of leading to a simultaneous lifting operation when the opposed beams move through a simple harmonic motion.

The substantially identical movement of the beams is particularly attained by an equalizer linkage assembly, as described. Such linkage assembly reports a movement of each beam to its opposed beam and to the other beams by an intermediate gear unit and transverse members which engage all the beams. Thus, the other beams responsively sense the movement of a particular beam and then move in a similar manner. Another advantage is the track and roller system in which a roller at the end of each beam rides a fixed track aligned therewith so that such beams do not swing from the plane defining the arched path of travel.

In the embodiment shown, the press is a large structure of some 250 tons in which great pressing pressures are required once the plates have been closed. It has thus been provided that the pressing pressures are applied by independent means once the raising beams have closed the plates. Such means have been shown as a plurality of cylinders positioned below the lowermost plate which has been closed. A lowermost pressing platen has been shown fixed to such cylinders so that a planar pressing surface is provided against a lowermost plate.

The means for simultaneously closing the plates and then pressing them may be applied to pressing operations other than the hot plate press particularly disclosed herein. In such a hot plate press, a manifold head is provided for supplying hot fluid to chambers within the individual closing plates. The closing and opening operation as well as the infeed of hot fluid may be controlled automatically or semi-automatically.

Various conventional circuits and controls may be provided to operate the press. In such controls the circuits were not described in detail because they may be conventional devices and do not as such comprise a part of the inventive subject matter. Some mention may be made, however, of a semi-automatic operation in which a hydraulic circuit has different pumps operated by solenoid switches. When the press is in a fully open position as shown in FIGURE 2, the platen press 44 may trip suitably positioned limit switches which de-energize various solenoids so no pumps are working.

An accumulator may be provided which is charged and ready to operate, and the semi-automatic cycle may be started by a switch to energize the solenoids to start a pump, and such pump together with the accumulator may exhaust by supplying pressure to lift cylinders 48 and 50 and 48a and 50a to obtain an initial fast rate of rise. Other pumps in the circuit may be activated by solenoids to provide high pressure fluid to lift the cylinders and the platen so the plates close substantially simultaneously with the platen and with one another. A controller may be provided, such as a pneumatic pressure control equipped with elapsed time control, and the system may be set so that at the time the plates close, a low pressure set in the controller is energized and other pumps are started. This will close the plates at a moderate pressing rate. Once the plates are closed and an initial tonnage has developed to press the plate, a pressure switch may be tripped to again fully charge the accumulator by pumps so that pressure may be built up in the press cylinders. When the press cylinders attain a predetermined level of pressure, a preset pressure contact on the controller may be tripped to start a cycle dwell timer in the controller to time the closing period of the plates. At the same time, a controller signal to the pumps will govern the press tonnage. At this time hot fluid is introduced to the closed plates from the inlet header and when the dwell timer times out on the end of a preset pressure dwell, a signal from the controller reduces pump pressure so that the pump can decompress the cylinders. A pressure switch in the system may be tripped by the falling pressure in the lifting cylinders so the oil in the lifting and pressing cylinders is exhausted. As the press and plates open, a limit switch on the press may be tipped at a nearly fully open position to slow down the press platen to prevent hard bottoming. When the platen reaches a fully open position other limit switches may be tripped to de-energize the solenoids so that no pumps operated. The press will then be ready for the succeeding cycle of operation.

Various safety controls may be built into the system such as high oil temperature controls which would cut out oil from the pipe base when the temperature reaches a certain temperature, say 170° F., to provide an emergency stop if the plates travel beyond the normal stroke. The press open controls may still be operative to lower the press to the fully opened position. Other smaller types of limit switches may be provided to make all the controls inoperative if the plates come out of parallel position relative to one another.

Rather than providing a semi-automatic operation, a fully automatic operation may be set up which is set to a timed sequence cycle of operation. Such controls as well as other controls not referred to may be used for controlling the operation of the press.

The simultaneous closing of the plates also allows the produce which is pressed to be purged of gases by breathing in appropriate situations. The pressure on the pressed product is released by only a small movement of, say, one inch of the plates so that the gases may escape from the pressed product through a breathing step. To close the plates and repress the product, only this same distance of one inch need be traversed by the plates. In a non-simultaneous assembly a press would have to open to its full stroke in order for the pressed product in the last plate to breathe.

The foregoing operation can now be practiced, and such practitioners will know that the invention is not necessarily restricted to the particular embodiments presented herein. The scope of the invention is to be defined by the terms of the following claims as given meaning by the preceding description.

I claim:

1. A multi-platen press with simultaneous closing assembly which includes, in combination, a frame having a base, a plurality of standards on said base and a top, a plurality of pressing plates disposed in the frame, two pairs of opposed beams at inactive positions pivoted at their outer and raised ends, their lower ends resting at the top of the frame, a series of wire ropes depending from each beam, each rope secured to a different plate, the rope towards the lower end secured to the more further spaced plates and the rope towards the raised end secured to the more closely spaced plates, a sheave assembly generally positioned below each beam, the sheave assembly having individual sheaves staggered relative to one another and around which turn different ropes depending from the respective beam above the sheave assembly, the correspondingly positioned ropes on all four beams secured to the same plate to provide four lifting points on the plate, and lifting cylinders positioned below the lowered ends of the beams, which cylinders raise the beams around their pivot points and thereby substantially simultaneously close the pressing plates.

2. A press as in claim 1 further characterized by and including a platen positioned under the lowermost pressing plate secured by the ropes to the beam, and a plurality of underlying pressing cylinders which are adapted to move the platen and press the plates after they have been closed by the raised beam.

3. A press as in claim 1 further characterized by and including a track aligned with the lower end of each beam, a roller associated with each beam lifting cylinder, with said rollers adapted to ride their respective track while lifting said beams.

4. A press as in claim 1 further characterized by and including a plurality of supports in the frame positioned along the corners of the plates, each support having staggered stops to provide a support for the individual plates in the fully open position.

5. A press as in claim 1 further characterized in that the plates have chambers to receive hot fluid for heat pressing.

6. A press as in claim 5 further characterized by and including a manifold header adjacent to the frame and a plurality of hydraulic conduits connecting the header to the various hot pressing plates to introduce said hot fluid.

7. A press as in claim 1 further characterized by and including an equalizer linkage associated with each pair of opposed beams to follow the movement of the beams, and means responsive to the movements of said linkages whereby the movement of one beam is sensed by the other beams so that said beams execute substantially identical movements.

8. A press as in claim 7 further characterized in that said equalizer linkage is associated with the two pairs of beams at the top of the frame, said equalizer linkage having links associated with each beam, and means responsive to the movement of said links so that the movement of one beam is sensed by the other three beams so that said beams execute substantially identical movements.

9. A multi-platen press with simultaneous closing assembly which includes, in combination, a frame having a base, vertical supports and a top, a plurality of pressing plates disposed in the frame, two pairs of opposed beams on the top of the frame, each beam at inactive position pivoted at one raised end to a support at the top of the frame, the lowered end resting at the top of the frame, one pair of opposed beams positioned behind another pair of opposed beams, a series of wire ropes depending from each beam, each rope secured to a different pressing plate, the rope towards the lower end secured to the more further removed plate, and the rope towards the raised end secured to the more closely spaced plates, a correspondingly positioned rope on each beam secured to the same plate so that said plate is raised at four lifting points, a sheave assembly positioned generally below each beam, the assembly having a plurality of staggered sheaves relative to one another and around which turn the various ropes depending from the beam, an equalizer linkage associated with each beam to follow the movement of the beam, means responsive to movement of said linkage so that the movement of one beam is sensed by the other beams whereby said beams execute substantially identical movements, and a hydraulic cylinder positioned below the lower end of each beam so that the lifting thrust of said cylinder will raise the beam around its pivot point and simultaneously close the pressing plates secured to the ropes depending from said beams.

10. A press as in claim 9 further characterized by and including a platen positioned under the lowermost pressing plate secured by the ropes to beam, and a plurality of underlying hydraulic pressing cylinders which are adapted to move the platen and press plates after they have been closed by the raised beams.

11. A press as in claim 10 further characterized by and including a track aligned with the lower end of each beam, a roller associated with each beam lifting cylinder, with said rollers adapted to ride their respective track while lifting said beams.

12. A press as in claim 9 further characterized by and including a plurality of supports positioned in the frame along the corners of the plates, each support having staggered stops to provide a support for the individual plates in the fully opened position.

13. A multi-platen press with simultaneous closing assembly which includes, a frame, a plurality of pressing plates disposed in said frame, beams on top of such frame, each beam at inactive position pivoted at one raised end, the lower end resting at the top of said frame, a series of flexible lines depending from each beam, each line secured to a pressing plate, the lines toward the lower ends of said beams secured to the more further spaced plates, and the lines toward the raised ends secured to the more closely spaced plates, means to lift said beams so that the plates may be simultaneously closed, and a pressing cylinder under said plates adapted to press said plates after such plates have closed, with said beam lifting means comprising a lifting cylinder associated with each beam, a track aligned with the lower end of each beam, and a roller associated with each beam lifting cylinder, with said rollers adapted to ride their respective track while lifting said beams.

14. The structure of claim 13 further characterized by and including a sheave assembly below each beam in which sheaves are offset relative to one another so that a flexible line may turn around a sheave when it raises and lowers the plate to which it is attached.

15. The structure of claim 13 further characterized by and including a plurality of supports in said frame positioned along the corners of said pressing plates, each support having staggered stops to support said pressing plates when such plates are in the fully opened position.

16. The structure of claim 13 further characterized by and including stabilizing linkage means whereby the movement of one beam is sensed by and transmitted to all other beams so that all said beams execute substantially identical movement.

17. A multi-platen press with simultaneous closing assembly which includes, a frame, a plurality of pressing plates disposed in said frame, opposed beams on top of said frame, each beam at inactive position pivoted at one raised end, a series of flexible lines depending from each beam, said lines secured to said plates, means to lift said beams and thereby close said plates, stabilizing linkage means whereby the movement of one beam is sensed by and transmitted to all other beams so that all said beams execute substantially identical movements, and at least one pressing cylinder under said plates adapted to press said plates after such plates have closed, with said beam lifting means and said stabilizing linkage means operatively independent of said pressing cylinder.

18. The structure of claim 17 further characterized in that said stabilizing linkage means comprise: a generally vertically disposed link associated with each beam, each said vertical link being pivotally attached at its upper end to its respective beam; two rotatable connecting links, each said vertical link emanating from non-opposed beams pivotally attached at its lower end to one of said connecting links, thereby linkably joining all beams pivoted from the same side of said frame; two generally horizontally disposed links, each said horizontal link pivotally attached to its respective connecting link; two journalled shafts, each said horizontal link pivotally attached to its respective shaft, each said shaft having a gear mounted thereon with said gears engaged, thereby linkably connecting all opposed beams.

19. The structure of claim 17 further characterized by and including a sheave assembly below each beam in which sheaves are offset relative to one another so that a flexible line may turn around a sheave when it raises and lowers the plate to which it is attached.

20. The structure of claim 17 further characterized by and including a plurality of supports in said frame positioned along the corners of said pressing plates, each support having staggered stops to support said pressing plates when such plates are in the fully opened position.

References Cited

UNITED STATES PATENTS

| | | | |
|---|---|---|---|
| 1,854,341 | 4/1932 | Laussucq | 100—199 X |
| 2,172,003 | 9/1939 | Stanley et al. | 100—199 X |
| 2,217,652 | 10/1940 | Quick | 100—199 X |
| 2,500,791 | 3/1950 | Baldwin | 100—199 X |
| 2,558,796 | 7/1951 | Tapper | 100—199 X |
| 2,941,249 | 6/1960 | Rogers | 100—199 X |
| 3,009,495 | 11/1961 | Coate | 100—199 X |
| 3,202,088 | 8/1965 | Hammon et al. | 100—200 X |
| 3,209,405 | 10/1965 | Loewenfeld | 100—199 X |

FOREIGN PATENTS 953,384  11/1956  Germany.

LOUIS O. MAASSEL, *Primary Examiner.*